(12) United States Patent
Yamamoto (10) Patent No.: US 7,911,658 B2
(45) Date of Patent: Mar. 22, 2011

(54) IMAGE PROCESSING APPARATUS

(75) Inventor: Hideki Yamamoto, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 1219 days.

(21) Appl. No.: 11/512,263

(22) Filed: Aug. 30, 2006

(65) Prior Publication Data

US 2007/0047027 A1 Mar. 1, 2007

(30) Foreign Application Priority Data

Aug. 30, 2005 (JP) ................. 2005-249242

(51) Int. Cl.
*H04N 1/04* (2006.01)
(52) U.S. Cl. ........ 358/474; 358/498; 358/496; 358/501; 399/94; 399/405; 271/4.01; 271/186
(58) Field of Classification Search ........... 399/94, 399/405, 371, 367; 358/496, 498; 271/4.01, 271/109, 110, 291
See application file for complete search history.

(56) References Cited

U.S. PATENT DOCUMENTS

| | | | | |
|---|---|---|---|---|
| 5,353,360 A * | 10/1994 | Obara | ........... | 382/321 |
| 5,671,466 A * | 9/1997 | Hokamura et al. | ........... | 399/124 |
| 5,764,372 A * | 6/1998 | Kondo | ........... | 358/414 |
| 6,078,765 A | 6/2000 | Takano et al. | | |
| 6,584,299 B2 * | 6/2003 | Nomura | ........... | 399/405 |
| 2003/0063937 A1 * | 4/2003 | Nomura | ........... | 399/405 |
| 2004/0012824 A1 * | 1/2004 | Haas et al. | ........... | 358/474 |
| 2004/0109189 A1 | 6/2004 | Ikeda et al. | | |
| 2005/0147452 A1 * | 7/2005 | Sugimoto et al. | ........... | 400/613 |
| 2006/0114523 A1 * | 6/2006 | Ono | ........... | 358/474 |
| 2006/0256402 A1 * | 11/2006 | Katayama | ........... | 358/474 |
| 2008/0013115 A1 * | 1/2008 | Nakano | ........... | 358/1.9 |

FOREIGN PATENT DOCUMENTS

| | | |
|---|---|---|
| JP | 61-78267 | 4/1986 |
| JP | 5-238597 | 9/1993 |
| JP | 6-87250 | 3/1994 |
| JP | 7-95344 | 4/1995 |
| JP | 9-101708 | 4/1997 |
| JP | 10-212050 | 8/1998 |
| JP | 11-146112 | 5/1999 |
| JP | 2004-193880 | 7/2004 |

OTHER PUBLICATIONS

Japanese Office Action, with English translation, issued in Japanese Patent Application No. JP 2005-249242, mailed Sep. 4, 2007.
Chinese Office Action, with English translation, issued in Chinese Patent Application No. CN 2006101260124, mailed Oct. 15, 2007.

* cited by examiner

*Primary Examiner* — Negussie Worku
(74) *Attorney, Agent, or Firm* — Scully, Scott, Murphy & Presser, PC (57) ABSTRACT

An image processing apparatus is provided with an image reading unit configured to read an image on an original, the original being discharged from a discharging side of the image reading unit, an image forming unit configured to form an image on an recording medium, and a discharge guide configured to guide the original to the discharging side of the image reading unit, the discharge guide being arranged to cover the image forming unit from the discharging side of the image reading unit. The discharging guide is configured to be movable between an opened position and closed position with respect to the image forming unit, the image forming unit being exposed to outside when the discharging guide is located at the opened position.

15 Claims, 8 Drawing Sheets

IMAGE PROCESSING APPARATUS

CROSS-REFERENCE TO RELATED APPLICATION

This application claims priority under 35 U.S.C. §119 from Japanese Patent Application No. 2005-249242, filed on Aug. 30, 2005. The entire subject matter of the application is incorporated herein by reference.

BACKGROUND OF THE INVENTION

1. Technical Field

Aspects of the present invention relate to an image processing apparatus which is configured to scan an image formed on an original sheet and/or to scan an image on a recording sheet.

2. Related Art

Recently, the image processing apparatus as described above is generally required to be downsized. For this purpose, various changes have been made. For example, a facsimile apparatus which usually has an original scanning unit and image formation unit may be configured such that the image scanning unit is arranged above the image formation, and the original sheets scanned by the image scanning unit, and the recording sheets on which images are formed by the image formation unit are fed in the same direction. With such a configuration, the image processing apparatus can be downsized. An example of such an image processing apparatus is disclosed in Japanese Patent Provisional Publication No. HEI 7-95344.

In a facsimile apparatus configured as above (i.e., the image scanning unit is arranged above the image forming unit, it is necessary that the original sheet scanned by the scanning unit are guided to be discharged without being interfered by the image forming unit. In particular, when a foil sheet (i.e., a rolled thermo-sensitive sheet) is used as the recording sheet, the facsimile apparatus is typically provided with a cutting device on a downstream side of the image forming unit for cutting out image-formed portions of the recording sheet.

Since the cutting device is provided, a cover member for guiding the original sheet to be discharged and for protecting the cutting device is typically provided so as to cover the image forming unit and the cutting device.

In the facsimile apparatus, which is configured such that the cover member covers the image forming unit, when a jam of the recording sheet occurs, it is difficult to remove the jammed portion of the recording sheet from the facsimile apparatus due to the configuration of the cover member that covers the image forming unit.

If the facsimile apparatus is configured such that the image scanning unit is not arranged above the image forming unit, and if the image forming unit is exposed to outside when a cover of a main body of the facsimile apparatus is opened, the jammed sheet can be removed immediately simply by opening the cover member of the main body.

However, if the facsimile apparatus is configured as described above, i.e., the image forming unit is arranged below the image scanning unit, and the cover member is provided to cover the image forming unit, when the cover member of the main body is opened, the image forming unit cannot be viewed from outside, and only the image scanning unit is viewed from outside. Therefore, it is impossible for a user to directly touch the image forming unit or to indirectly touch the same using some tool.

If a jam of the recording sheet occurs in such a facsimile apparatus, what the user can do is to rewind the roll sheet to feed the sheet in a direction opposite to the feeding direction. It is almost impossible to remove the jam condition only by such an operation. In a worse case, while rewinding or pulling the recording sheet, it may be broken and retained inside the image forming unit. In such a case, the user cannot handle the jammed condition, and the user needs to ask a manufacturer or the like to fix the jammed condition.

SUMMARY OF THE INVENTION

Aspects of the present invention is advantageous in that the jam of the recording medium at or in the vicinity of the image forming unit of the image processing apparatus described above can be removed easily.

DESCRIPTION

General Overview

The following describes general aspects of the invention that may or may nor be included in various embodiments/modifications. Also, it is noted that various connections are set forth between elements in the following description. It is noted that these connections in general and, unless specified otherwise, may be direct or indirect and that this specification is not intended to be limiting in this respect.

According to aspect of the invention, there is provided an image processing apparatus, which is provided with an image reading unit configured to read an image on an original, the original being discharged from a discharging side of the image reading unit, an image forming unit configured to form an image on an recording medium, and a discharge guide configured to guide the original to the discharging side of the image reading unit, the discharge guide being arranged to cover the image forming unit from the discharging side of the image reading unit. The discharging guide is configured to be movable between an opened position and closed position with respect to the image forming unit, the image forming unit being exposed to outside when the discharging guide is located at the opened position.

With this configuration, the discharging guide can guide the original in its discharging direction and further the discharging guide covers the image forming unit. Therefore, in a normal state (i.e., the discharging guide covers the image forming unit), the image forming unit cannot be viewed from outside the image processing apparatus.

According to aspects of the invention, the discharging guide is openable. Therefore, by opening the discharging member, the image forming unit is exposed to outside. The term "exposed to outside" in this specification means not only viewable from outside, but the image forming unit and/or components in the vicinity thereof can be accessed (touchable directly or indirectly, i.e., using a tool) by the user.

Since the user can access the image forming unit or the vicinity thereof by opening the discharging guide, the jam can be handled easily.

The open/close operation of the discharge guide may be manually done by the user. Alternatively, by employing a dedicated mechanism so that the open/close operation is performed automatically. It should be noted that various modification can be applied as far as it allows the discharge guide to open/close. As the recording medium, various type of sheets can be employed. For example, so-called cut sheets having a predetermined size (A4, B5, etc.) or a roll type recording sheet, thermo-sensitive sheet can be employed.

The discharge guide may include a recording medium guiding part that guides the recording medium on which the image forming unit has formed an image in the discharging direction when the discharge guide is located at the closed position.

That is, the discharge guide may have a function of guiding the recording medium to be discharged from the image processing apparatus as well as a function of guiding the original to be discharged.

Therefore, with the above configuration, the recording medium after the image formation can be directed in the discharge direction smoothly, which may suppress occurrence of the jam condition. Further, according to this configuration, the mechanism for suppressing the jam need not be provided separately from the discharge guide. Thus, the function of suppressing the jam (i.e., function of supporting the discharge of the recording medium after image formation) can be realized inexpensively without upsizing the image processing apparatus.

In a conventional image forming unit which typically includes a recording head and a platen roller, the recording medium may be wound around the platen roller and causes the jam condition. In such a case, by pulling the recording medium, the wound portion may be removed from the platen roller.

However, after the jam has occurred, if the platen roller is mechanically connected to its driving source (e.g., a motor), the platen roller may not rotate freely, and a relatively large force is necessary to rotate the platen roller. Therefore, in such a configuration, even if the user pulls the recording medium, the platen roller may not rotate and the recording medium may not be removed therefrom.

For avoiding such a condition, a releasing mechanism may be employed as indicated below.

The image forming unit may include a recording head that records an image on the recording medium, a platen roller that feeds the recording medium with pressing the recording medium toward the recording head, a driving unit that is connected to the platen roller and drives the platen roller to rotate, and a releasing mechanism that releases engagement between the driving unit and the platen roller.

With the above configuration, as the releasing mechanism releases the engagement of the driving unit with the platen roller, the platen roller can rotate freely by the external force. Thus, by pulling the recording medium, the platen roller follows to rotate and the wounded portion of the recording medium can be removed easily.

It should be noted that the releasing of the engagement between the driving unit and the platen roller may be done in various ways.

In an example, the image processing apparatus may further include an error detection unit that detects an error status in which the recording medium is not fed normally during image formation by the image forming unit. The releasing mechanism may release the engagement between the driving unit and the platen roller when the error detection unit detects the error status.

It is noted that, when the error detection unit detects the error status, it is likely that the jam has occurred. In this example, the releasing mechanism releases the engagement simply when the error status is detected.

In another example, the image processing apparatus further include a switching device that allows releasing of the engagement between the driving unit and the platen roller. The releasing mechanism may release the engagement between the driving unit and the platen roller when the switching device allows the releasing of the engagement.

In this configuration, by setting the switching device to allow the releasing of the engagement. It is noted that the switching device may be a user operable device. Alternatively or optionally, the switching device may be configured to change the status in response to the open/close state of the cover and/or discharge guide. With such a configuration, the user is not required to operate the switching device directly, and the engagement between the driving unit and the platen roller is released simply by opening the cover or the discharge guide.

It is also possible to employ, in the above configuration, an error detection unit that detects an error status in which the recording medium is not fed normally during image formation by the image forming unit. In this case, the releasing mechanism may be configured to release the engagement between the driving unit and the platen roller when the switching device allows the releasing of the engagement and the error detection unit detects the error status.

With this configuration, the engagement is released only when necessary, and an unnecessary operation can be avoided.

The driving unit may include a motor having a rotational shaft, the image processing apparatus further may include a driving force transmitting mechanism which is connected to the rotational shaft of the motor and transmits a rotational force to the platen roller, and the releasing mechanism may release the engagement between the driving unit and the platen roller by disengaging the motor and the driving force transmitting mechanism.

The driving force transmitting mechanism may include at least one transmitting gear, the releasing mechanism may include a motor controller configured to control a rotational direction of the motor, a sun gear rotated by the motor, and a planetary gear that always engages with the sun gear, the planetary gear being engaged with the one transmitting gear included in the driving force transmitting mechanism. The releasing of the engagement between the motor and the platen roller may be achieved by rotating the motor in a direction opposite to a direction where the planetary gear engages with the one transmitting gear and the rotational driving force is transmitted to the platen roller.

Thus, simply by changing the rotational direction of the motor, the mechanical engagement between the motor and the platen roller can be released.

The image processing apparatus may further include a cutting unit configured to cut out the recording medium after an image is formed thereon. The discharging guide may be configured to cover the cutting unit as well as the image forming unit, and the image processing apparatus may further include a protecting member that prevents the cutting unit from being exposed to outside when the discharging guide is located at the open position.

The image forming unit may be arranged below the image reading unit such that at least a part of the image forming unit is hidden by the image reading unit when viewed from a top of the image processing apparatus.

EMBODIMENTS (1) Entire Configuration of Facsimile Apparatus

Figure 1:
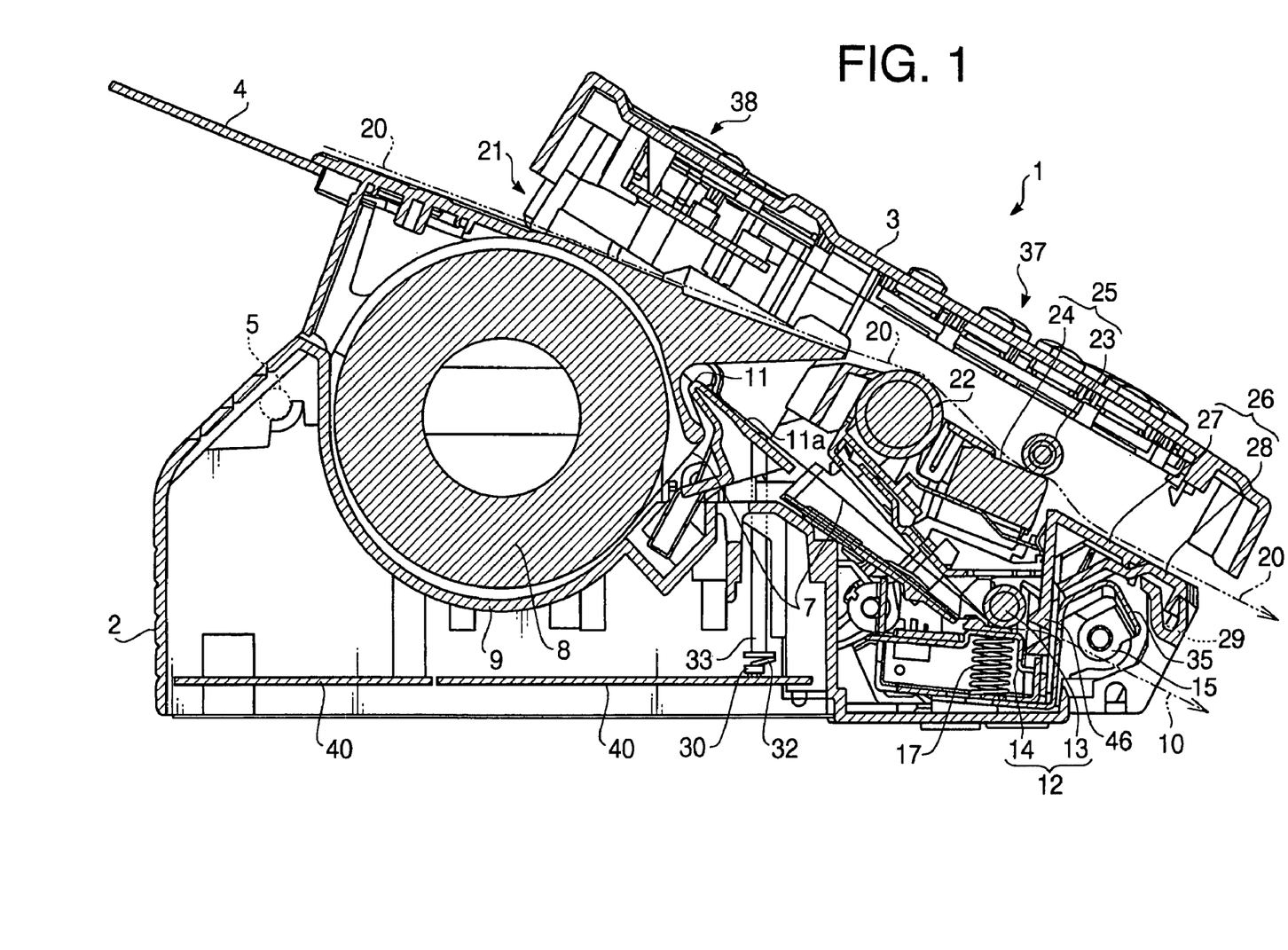
FIG. 1 is a cross-sectional side view of a facsimile apparatus according to aspects of the invention.

FIG. 1 is a cross-sectional side view of a facsimile apparatus 1 according to aspects of the present invention. As shown in FIG. 1, the facsimile apparatus 1 is provided with a cover 3 which can be opened with respect to a case 2 of the main body of the facsimile apparatus 1. For explaining purpose, hereinafter, a right-hand side of the facsimile apparatus 1 in FIG. 1 will be referred to as a front side of the facsimile apparatus 1, and the left-hand side will be referred to as a rear side of the facsimile apparatus 1. An original tray 4 is provided at an upper rear portion of the cover 3.

Specifically, the case 2 and the cover 3 are rotatably connected via a rotation shaft 5 at rear side portions thereof. When a user opens the cover 3 by operating a lever (not shown), the cover 3 rotates counterclockwise in FIG. 1 about a rotation shaft 5 and is opened. With the movement of the cover 3, components mounted on an upper part of the facsimile apparatus 1 such as an operation panel 37 and a display panel 38 as well as the original tray 4 move (rotate) together with the cover 3.

To the case 2, a roll tray 9 is formed at its rear portion. The roll tray 9 is a semi-cylindrical tray with its upper side being opened. The roll tray 9 accommodates a recording sheet roll 8 which is configured such that a recording sheet 7 such as a thermal sheet is wound as a roll. The recording sheet 7 is pulled out of the roll tray 9, fed to an image forming unit 12 via a curl removing unit 11. After an image is formed on the recording sheet 7 at the image forming unit 12, the recording sheet 7 is fed along a recording sheet discharging path 10 and is discharged to outside (front side) of the facsimile apparatus 1. Specifically, after passing the curl removing unit 11, the recording sheet 7 proceeds between the image forming unit platen 13 and a thermal head 14, and final cut at a recording sheet cutting unit 15 and discharged.

The recording sheet 7 is sufficiently wide so as to correspond to a recordable range of the thermal head 14, which is a linear head having multiple heating elements arranged in a width direction of the facsimile apparatus 1. The curl removing unit 11 is provided on a downstream side of the recording sheet roll 8 along the path of the recording sheet 7, and functions to straighten the recording sheet 7 (i.e. to remove the curling tendency of the recording sheet 7).

On the downstream side of the curl removing unit 11, along the sheet feed path, the image forming unit 12 including the recording side platen 13 and the thermal head 14 is arranged. The recording side platen 13 is driven by a driving mechanism including a motor 51, which will be described later. The recording side platen 13 is driven to feed the recording sheet 7 toward the front side of the facsimile apparatus 1 and discharge the recording sheet 7 from the facsimile apparatus 1.

The thermal head 14 is arranged to face the recording side platen 13. The thermal head 14 is a so-called line thermal head provided with multiple heat generating elements, which are aligned in a line. The thermal head 14 covers the printable range of the recording sheet 7, and a desired image (e.g., an image received through an external telephone line) can be printed on the recording sheet using the thermal head 14. The thermal head 14 is urged toward a bottom side of a circumferential surface of the recording side platen 13 by an urging spring 17. In other words, the recording side platen 13 presses the thermal head 14 by a counteraction of a load received from the urging spring 17. With this configuration, the recording sheet 7 fed between the recording side platen 13 and the thermal head 14 is press-contacted to the thermal head 14 by the recording side platen, so that the heat generated by the thermal head 14 is applied to the recording sheet 7.

On the downstream side of the image forming unit 12, there is provided the recording sheet cutting unit 15 for cutting out the portion of the recording sheet 7, on which portion the image has been formed. The cut-out portion is discharged from the facsimile apparatus 1. As above, according to the facsimile apparatus 1, the portion of the recording sheet 7 bearing an image is cut out by the cutting unit 15, and is discharged.

Below the curl removing unit 11, a pressing member 33 and a switch 30 which is switched ON/OFF depending on the up/down position of the pressing member 33 are provided to detect presence/absence of the recording sheet 7 thereat.

Specifically, the upper end portion of the pressing member 33 is arranged to penetrate through and protrude above a curl removing unit cover 11a of the curl removing unit 11. When there is no recoding sheet 7 at the position of the pressing member 33 (i.e., when the pressing member 33 is in its free state), by an urging force of a sprint (not shown), the upper end portion of the pressing member 33 protrudes above the curl removing unit cover 11a by a relatively large amount (i.e., protrude farther in comparison with a state shown in FIG. 1). In such a state, the lower surface of the pressing member 33 is spaced from the movable piece 32 of the switch 30. That is, no external force is applied to the movable piece 32, thereby the switch 30 is in the OFF state, and the absence of the recoding sheet 7 is detected.

On the contrary, if the recording sheet 7 is normally set, the upper end portion of the pressing member 33 is depressed by the recording sheet 7 as shown in FIG. 1. In this state, the movable piece 32 is pressed by the bottom surface of the pressing member 33, thereby the detection switch 30 is turned ON and the presence of the recording sheet 7 is detected.

As above, if the facsimile apparatus 1 runs out of the recording sheet 7 or a normally set status of the recording sheet 7 is lost due to the sheet jam or the like and the recording sheet 7 does not contact the upper end portion of the pressing member 33, the absence of the recording sheet 7 is detected.

The original sheets placed on the original tray 4 for facsimile transmission (not shown) are, when inserted in the original inlet 21, fed inside an original feeding path 20 by an ADF (Automatic Document Feeder) and/or a roller 22 and a reading unit platen 23. Specifically, when the original sheets are inserted in the original inlet 21, one of the original sheets is fed by the ADF roller toward an original scanning unit by the ADF roller 22. It should be noted that, a sheet separating piece 31 (see FIG. 4) for separating multiple sheets and preventing more than two original sheets from fed together is arranged to contact the surface of the ADF roller 22. Thus, the ADF roller 22 feeds the original sheets inserted into the original inlet 21 one by one in association with the sheet separating piece 31.

On the downstream side of the ADF roller 22, an original reading unit 25 is provided. The original reading unit 25 includes a CIS (Contact Image Sensor) 24 and a reading unit platen 23 which is arranged to be urged toward the upper portion of the CIS 24. When the original sheet fed along the original feeding path 20 passes a nip between the CIS 24 and the reading unit platen 23, the CIS 24 sequentially reads the image formed on the original sheet.

On the downstream side of the CIS 24, a discharging roller (not shown) is rotatably provided. The original sheet scanned by the CIS 24 is fed by the discharging roller and discharged out of the facsimile apparatus 1.

On the downstream side of the original reading unit 25, on the original feeding path 20, an original passage 26 for guiding the original sheet in the discharging direction is defined so that the original sheet can be fed and discharged without fail after the image thereon is scanned.

Figure 8:
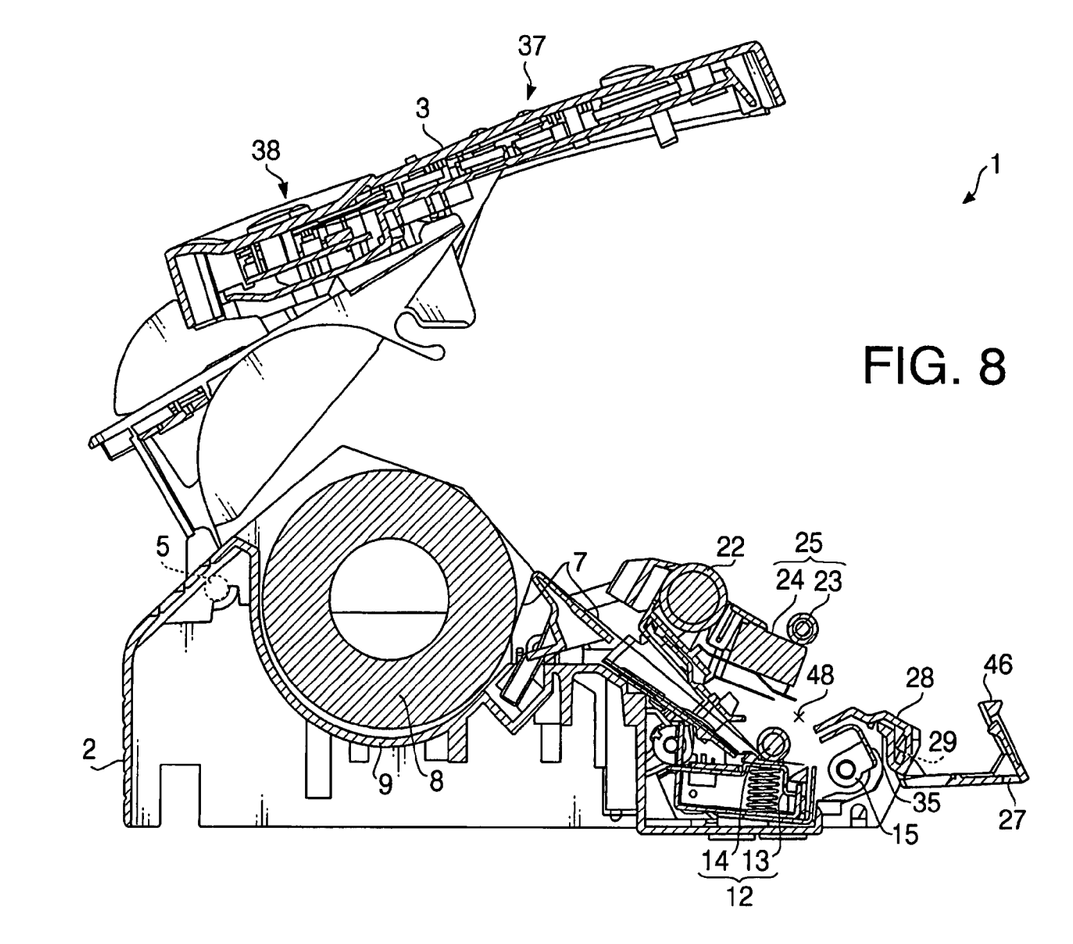
FIG. 8 is a cross-sectional side view of the facsimile apparatus with the main cover and a sub cover being opened.

The original passage 26 includes the openable cover 27 and a fixed cover 28. The openable cover 27 is arranged to cover the image forming unit 12 and the cutting unit 15, and configured to be openable with respect to the cutting unit 15. An opening/closing operation of the openable cover 27 is done by rotting the openable cover 27 about a rotation shaft 29. FIG. 1 shows a state where the openable cover 27 is fully closed. By rotating the openable cover clockwise in FIG. 1, about the rotation shaft 29, the openable cover 27 opens as shown in FIG. 8.

When the openable cover 27 is opened, the image forming unit 12 is exposed to the outside (front side) of the facsimile apparatus 1. That is, when the openable cover 27 is opened, the user can see and touch the image forming unit 12 directly. Therefore, even if the recording sheet 7 is jammed during an image forming process at the image forming unit 12 and a sheet jam condition is occurred, the user can easily handle the problem merely by opening the openable cover 27. An operation to handle the jammed condition will be described later.

At an movable end of the openable cover 27 (i.e., a portion on the downstream side of the recording unit platen 13), a sheet guide 46 for ensuring discharging of the recording sheet 7 after image formation thereon along the sheet discharging path 10 is formed. The recording sheet 7 passed through the image forming unit 12 is guided by the sheet guide 46 and discharged from the facsimile apparatus 1 along a predetermined sheet discharging path 10.

According to the facsimile apparatus 1, the original reading unit 25 is located above the image forming unit 12, as shown in FIG. 1. That is, when the facsimile apparatus 1 is viewed from the top, a most part of the image forming unit 12 is covered with the image reading unit 25. Further, both the original sheet and the recording sheet 7 are discharged to the front side of the facsimile apparatus 1. As such, downsizing of the facsimile apparatus 1 is realized.

On the cover 3, an operation panel 37 provided with numeral keys, function keys and the like is provided. A display panel 38 including an LCD (Liquid Crystal Display) for displaying various pieces of information including an operational status of the facsimile apparatus 1, transmission/reception status and the like is also provided to the cover 3. As the user operates a key of the operation panel 37, an operation corresponding to the operated key will be executed.

On a lower part of the roll tray 9 inside the case 2, a printed circuit board 40 on which various electronic circuits for controlling the operations of the facsimile apparatus 1 are formed is arranged.

(2) Configuration of Driving Mechanism

Figure 2:
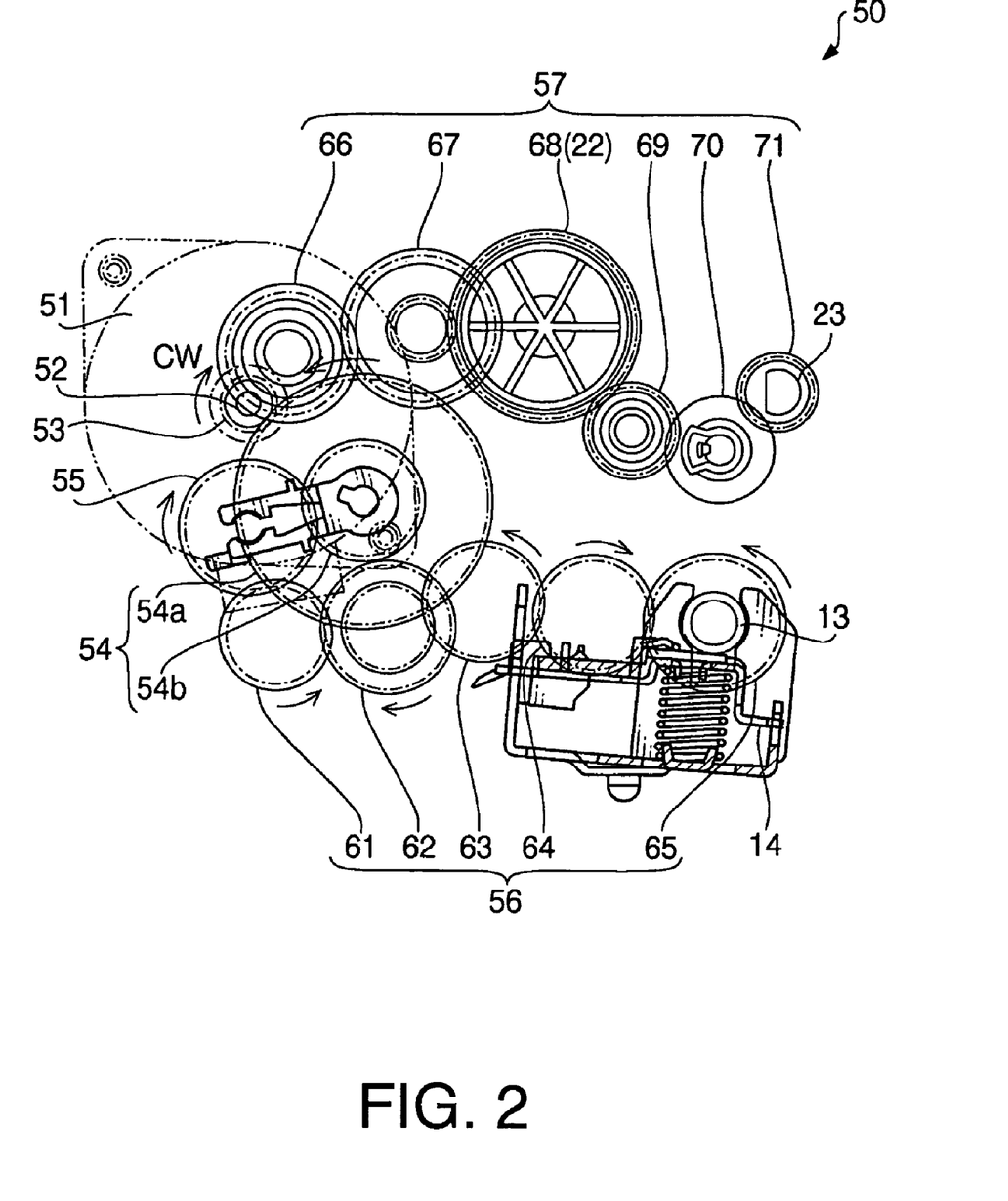
FIG. 2 schematically shows a configuration of a driving mechanism that transmits a driving force of a motor to a recording unit platen, according to aspects of the invention.

Next, the driving mechanism that transmits a rotational driving force to the recording unit platen 13 when the image is formed on the recording sheet 7, and transmits a rotational driving force to the reading unit platen 23 when the image on the original sheet is read will be described with reference to FIGS. 2 and 3. FIG. 2 shows a status where the driving force of the motor is transmitted to the recording unit platen 13, and FIG. 3 shows a status where the driving force of the motor is not transmitted to the recording unit platen 13 or the reading unit platen 23.

Figure 3:
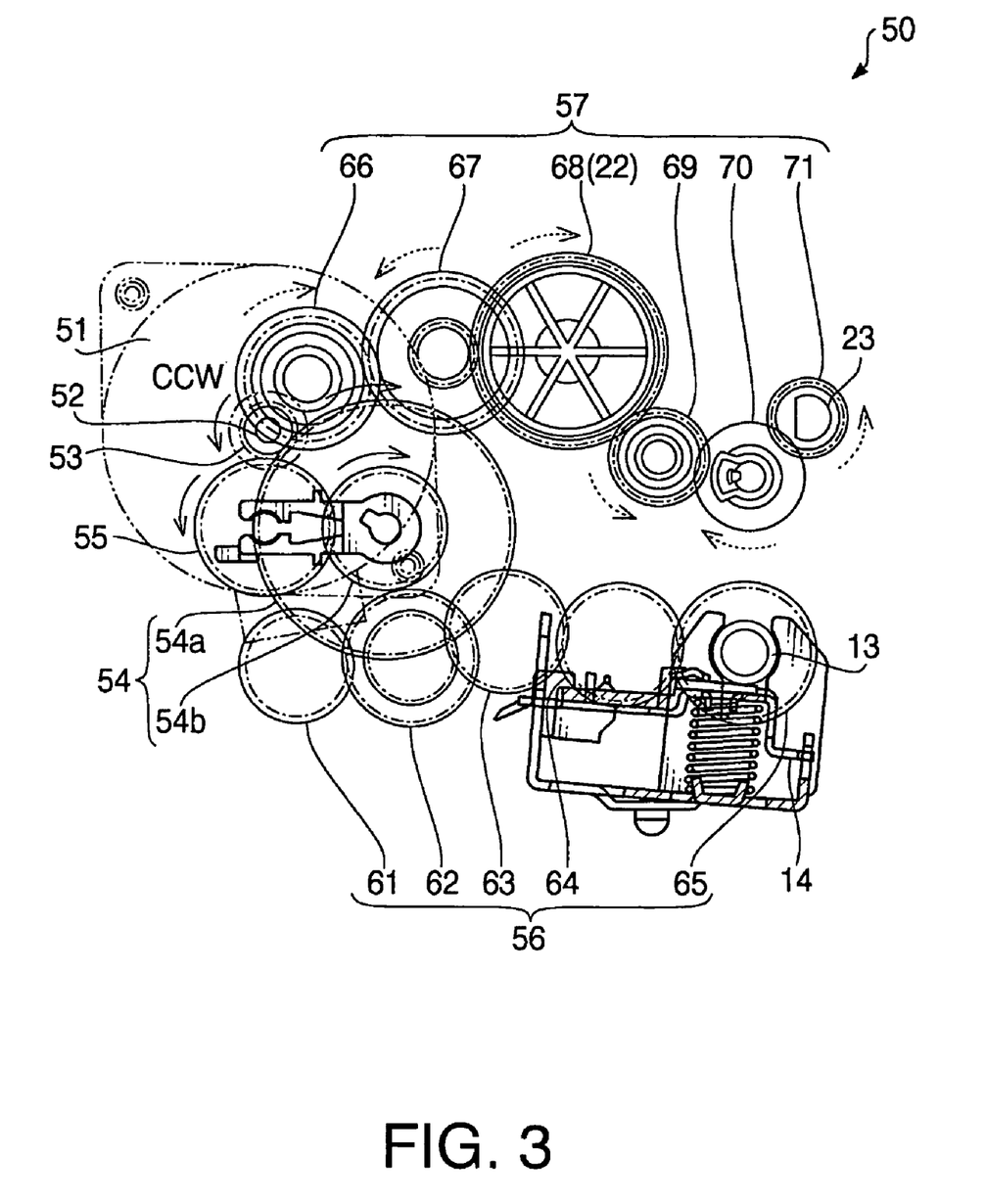
FIG. 3 schematically shows a configuration of the driving mechanism when no driving force is transmitted to the recording unit platen or a scanning unit platen, according to aspects of the invention.

As shown in FIGS. 2 and 3, the driving mechanism 50 is provided with the motor 51, which is a stepping motor in this exemplary embodiment, a motor gear 53 which is coaxially secured to and integrally rotates with a rotary shaft 52 of the motor 51, a sun gear 54 which always engages with the motor gear 53, a planetary gear 55 which always engages with the sun gear 54, a first driven gear that engages with the planetary gear 55 when the motor 51 is rotates clockwise in FIGS. 2 and 3, a recording unit gear train 56 including the first driven gear 61 and four driven gears 62, 63, 64 and 65, a sixth driven gear 66 that engages with the planetary gear 55 when the motor 51 rotates counterclockwise, and a reading unit gear train 57 including the sixth driven gear 66 and driven gears 67, 68, 69, 70 and 71.

The sun gear 54 includes a larger diameter section 54a and a smaller diameter section 54b. The larger diameter section 54a engages with the motor gear 53, and the smaller diameter section 53b engages with the planetary gear 55. Therefore, as shown in FIG. 2, when the motor 51 rotate clockwise, the rotation is transmitted to the planetary gear 55 via the smaller gear 54b. Then, the planetary gear 55 rotates clockwise in FIG. 2 and further moves toward the first driven gear 61, and engages with the first driven gear 61. When the motor 51 rotates counterclockwise, the planetary gear 55 rotates counterclockwise, and further moves toward the sixth driven gear 66. Thus, the planetary gear 55 is disconnected from the first driven gear 61 and connected to the sixth driven gear 66.

The recording unit driven gear train 56 includes a first driven gear 61 to be engaged with the planetary gear 55, a second driven gear 62 engaged with the first driven gear 61, a third driven gear 63 engaged with the second driven gear 62, a fourth driven gear 64 engaged with the third driven gear 63 and a fifth driven gear 65 engaged with the fourth driven gear 64. The fifth driven gear 65 is coaxial with the recording unit platen 13 and rotates integrally with the recording unit platen 13.

A reading unit driven gear train 57 includes a sixth driven gear 66 engaged with the planetary gear 55, a seventh driven gear 67 engaged with the sixth driven gear 66, an eighth driven gear 68 engaged with the seventh driven gear 67, a ninth driven gear 69 engaged with the eighth driven gear 68, a tenth driven gear 70 engaged with the ninth driven gear 69 and an eleventh driven gear 71 engaged with the tenth driven gear 70. The eleventh driven gear 71 is coaxial with the reading unit platen 23 and rotates integrally with the reading unit platen 23. The eighth gear 68 is coaxial with the ADF roller 22 and rotates integrally with the ADF roller 22.

When an image is formed on the recording sheet 7, the driving mechanism 50 operates such that the motor 51 rotates clockwise in FIG. 2 in order to rotate the recording unit platen 13. Then, as described above, the planetary gear 55 engages with the first driven gear 61, and the rotation of the planetary gear 55 is transmitted to the fifth driven gear 65. Then, the recording unit platen 13 coaxial with the fifth driven gear 65 rotates counterclockwise (see FIG. 2).

That is, by rotating the motor 51 clockwise, the rotational force of the motor 51 is transmitted to the recording unit platen 13 via the motor gear 53, the sun gear 54, the planetary gear 55 and the recording unit gear train 56. It should be noted that, when the planetary gear 55 engages with the first driven gear 61 and the motor 51 is mechanically connected with the recording unit platen 13, if the motor 51 is not rotating, it is very difficult for the user to rotate the recording unit platen 13.

If the rotational direction of the motor 51 is switched from the clockwise direction (where the rotational force of the motor 51 is transmitted to the recording unit platen 13 as shown in FIG. 2) to the counterclockwise direction, the planetary gear 55 is disengaged from the first driven gear 61 (see FIG. 3). If the motor 51 is further rotated counterclockwise, the planetary gear 55 engages with the sixth driven gear 66 included in the reading unit driven gear train 57. With this arrangement, the rotation of the planetary gear 55 is transmitted to the eleventh driven gear 71, and the reading unit platen 23, which is coaxial with the eleventh driven gear 71, rotates counterclockwise (see broken line in FIG. 3).

As above, by switching the rotating direction of the motor 51, disengagement between the planetary gear 55 and the first driven gear 61, thus, disengagement between the motor 51 and the recording unit driven gear train 56 is achieved.

When the motor 51 is disengaged from the recording unit platen 13 as the planetary gear 55 is disengaged from the first driven gear 61, the recording unit platen 13 is freely rotatable. Therefore, according to the facsimile apparatus 1, when the jam of the recording sheet 7 occurs, the motor 51 is rotated counterclockwise to release the engagement so that the recording unit platen 13 can be rotated by the user easily.

Figure 4:
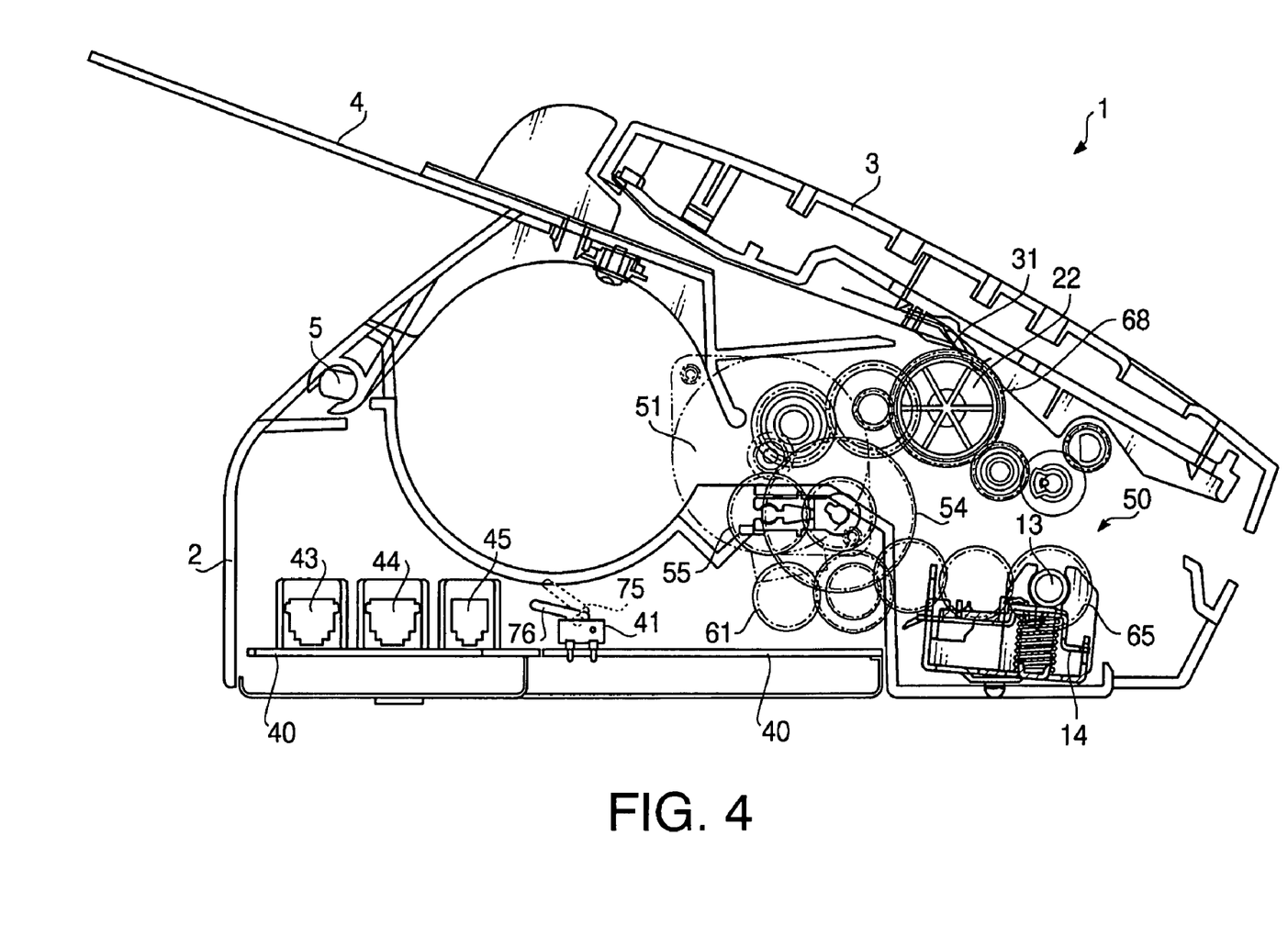
FIG. 4 is a side view showing an arrangement of the driving mechanism.

FIG. 4 schematically shows a side view of the facsimile apparatus 1 showing the configuration of the driving mechanism 50. As described above, the eighth driven gear 68 of the reading unit driven gear train 57 is provided coaxially and integrally with the ADF roller 22. Further, on the circumferential surface of the ADF roller 22, the separating piece 31 contacts. As described previously, by cooperation of the separating piece 31 and the ADF roller, transfer of multiple sheets is prevented.

As shown in FIG. 4, on the printed circuit board 40, a cover open/close detection switch 41, a telephone line connecting terminal 43, an external telephone terminal 44 and a receiver connection terminal 45 are provided.

The cover open/close detection switch 41 is for detecting whether the cover 3 is open or closed. As shown in FIG. 4, the cover open/close detection switch 41 has a movable contact 76 which is rotatable about a rotation shaft 75. The movable contact 76 is located at a position as indicated by broken line in its neutral state (i.e., when no external force is applied to the movable contact 76). In this state, the cover open/close detection switch 41 is regarded as an OFF state and it is detected that the cover 3 is open.

The cover 3 is provided with an elongated pressing member (not shown) which is fixed the cover 3 and moves in the opening/closing direction as the cover is opened/closed. When the cover 3 is opened, the pressing member is released from the movable contact 76 of the cover open/close detection switch 41, and the movable contact 76 is in its free state. On the contrary, when the cover 3 is closed, the pressing member contacts (i.e., presses) the movable contact 76. Then, the movable contact 76 is pressed downward in FIG. 4 and rotates counterclockwise about the rotation shaft 75, and located at a position indicated by solid line in FIG. 4.

As described above, when the cover 3 is closed and the movable contact 76 is pressed, the cover open/close detection switch 41 is in its ON state and it is detected that the cover 3 is closed.

According to the facsimile apparatus 1, if there occurs a trouble in feeding the recording sheet 7, when the user opens the cover 3 (i.e., when the cover open/close detection switch 41 is turned OFF and the open state of the cove 3 is detected), the motor 51 rotates counterclockwise and the planetary gear 55 is disengaged from the first driven gear 61.

(3) Control of Motor

Next, a control process of the motor 51 that supplies the driving force to each of the platens 13 and 23 will be described.

Figure 5:
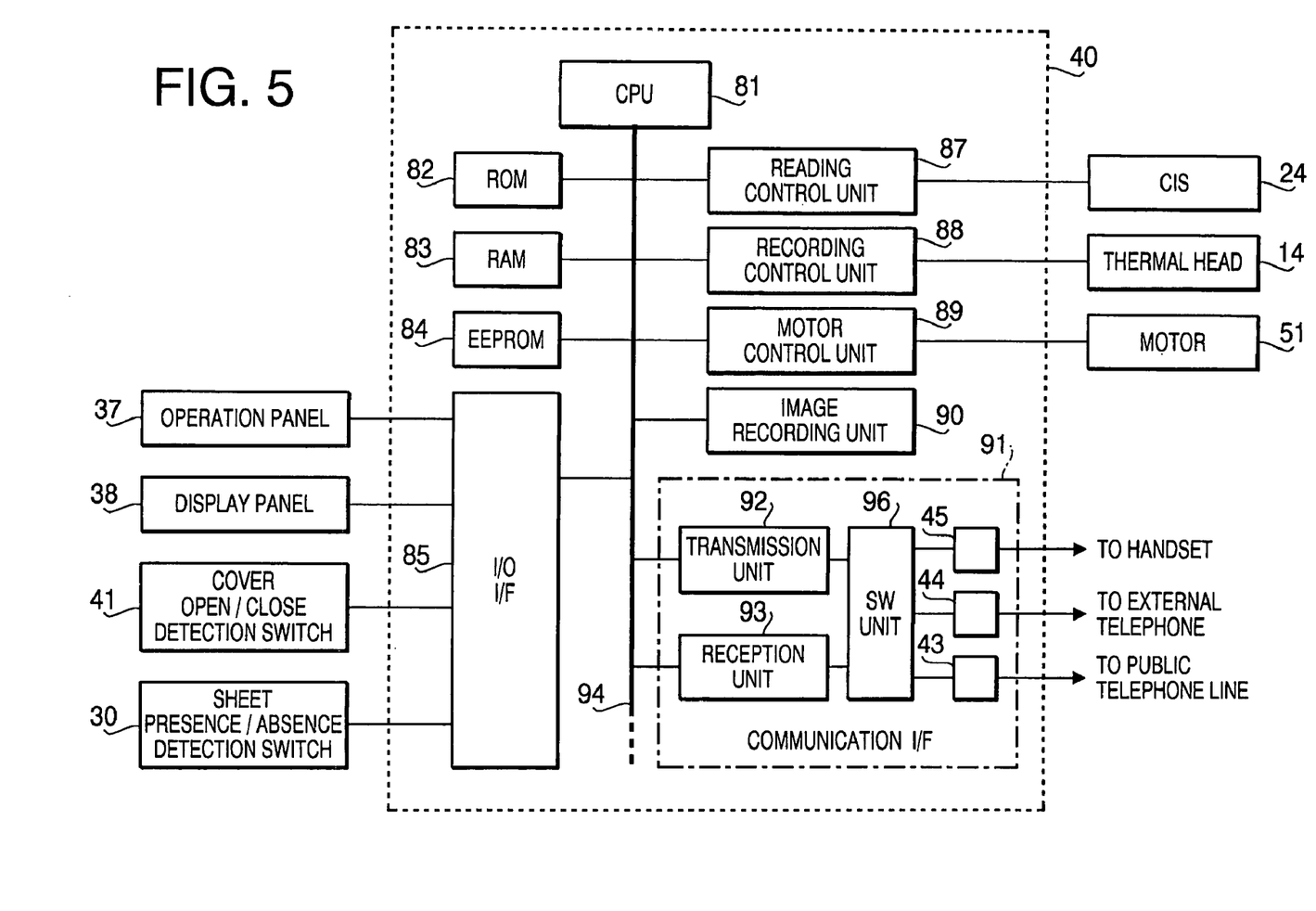
FIG. 5 is a block diagram of a control circuit of the facsimile apparatus according to aspects of the invention.

FIG. 5 shows a block diagram of a control circuit formed on the printed circuit board 40 for controlling operations of respective processes of the facsimile apparatus 1.

As shown in FIG. 5, the facsimile apparatus 1 is provided with a CPU (Central Processing Unit) 81 that controls the entire operation of the facsimile apparatus 1, a ROM (Read Only Memory) 82 storing various control programs to be executed by the CPU 81, a RAM (Random Access Memory) 83 to be used as a work area when the CPU 81 executes various programs, and an EEPROM 84 storing various programs to be executed by the CPU 81 and various parameters and the like to be used when various programs are executed. The facsimile apparatus 1 further includes an I/O (input/output) I/F (interface) 85 for displaying various pieces of information on a display panel 38 in accordance with the operation of the CPU 81, for directing information such as an operation of the operation panel 37 by the user, ON/OF status of the open/close detection switch 41, the ON/OFF status of the recording sheet presence/absence detection switch 41, the detection result of the recording sheet 7. The facsimile apparatus 1 further includes a reading unit controller 87 that controls reading of the image using the CIS 24, a recording unit controller 88 that controls image formation using the thermal head 14. The facsimile apparatus 1 further includes a motor control unit 89 that controls the rotation (direction and speed) of the motor 51, an image processing unit 90 that processes the image which represents the image scanned by the CIS 24 or the image to be printed by the thermal head 14. The facsimile apparatus 1 is further provided with a communication I/F (interface) 91 that executes data reception procedure for receiving audio and image data transmitted from an external device and/or transmitting image scanned by the CIS 24 to an external device (through a public telephone line). The above components are interconnected through an inside bus 94. The above-described function blocks are formed on the printed circuit board 40.

The communication I/F 91 includes a transmission unit 92 that transmits various pieces of data, a reception unit 93 that executes data reception process for receiving audio and/or image data, and a switching unit 96. The communication I/F 91 includes the three terminals: the line connection terminals 43; the external telephone terminal 44; and receiver connection terminal 45. To the line connection terminal 43, a telephone cable for connecting the handset is inserted.

The switching unit 96 operates to switch availability of the terminals 43, 44 and 45. The switching unit 96 also switches transmission unit 92 or reception unit 93 and line connection terminal 43. Specifically, when an aural communication is executed using the handset of the facsimile apparatus 1 with an external communication device, the line connecting terminal 43 and the handset connecting terminal 45 are alternately connected. If the aural communication with an external person is executed using an external telephone connected to the facsimile apparatus 1, the line connecting terminal 43 and the external telephone terminal 44 are alternately connected. If an image scanned by the image reading unit 25 is transmitted to outside, the image from the transmission unit 92 is transmitted to a public line network from the line connecting terminal 43, and when the image is being received through the public line network or in a standby state for receiving an image, an image is input from the line connecting terminal 43 to the reception unit 93.

The facsimile apparatus 1 configured as above operates such that, when an image is received from an external public telephone line by the communication I/F 91, the image processing unit 90 processes the image under control of the CPU 81. Then, the processed image is recorded by the recording unit controller 88 on the recording sheet 7 using the thermal head 14. When the image is recorded using the thermal head 14, the motor control unit 89 controls the rotation of the motor 51 in accordance with control of the CPU 81 and rotates the recording unit platen 13.

When an image on the original sheet is to be transmitted externally, the reading control unit 87 controls the CIS 24 to read the image of the original sheet. The read (scanned) image is processed by the image processing unit 90, and the processed image is output to the external public telephone line through the transmission unit 92. When the CIS 24 is reading the image on the original sheet, the motor control unit 89 controls rotation of the motor 51 in accordance with an instruction issued by the CPU 81 to rotate the reading unit platen 23.

If an error (e.g., running out of the recording sheet 7, jam of the recording sheet 7) occurs during image recording on the recording sheet 7 and the image recording cannot be continued normally, the CPU 81 controls the motor control unit 89 so that the motor control unit 89 rotates the motor 51 counterclockwise so that the motor 51 is disengaged from the recording unit platen 13. As above, when the error occurs, the motor 51 is controlled in a jam detection process executed by the CPU 81 during the image forming process. It should be noted that the detection of the error above is based on the detection signal output by the recording sheet presence/absence detection switch 30.

Figure 6:
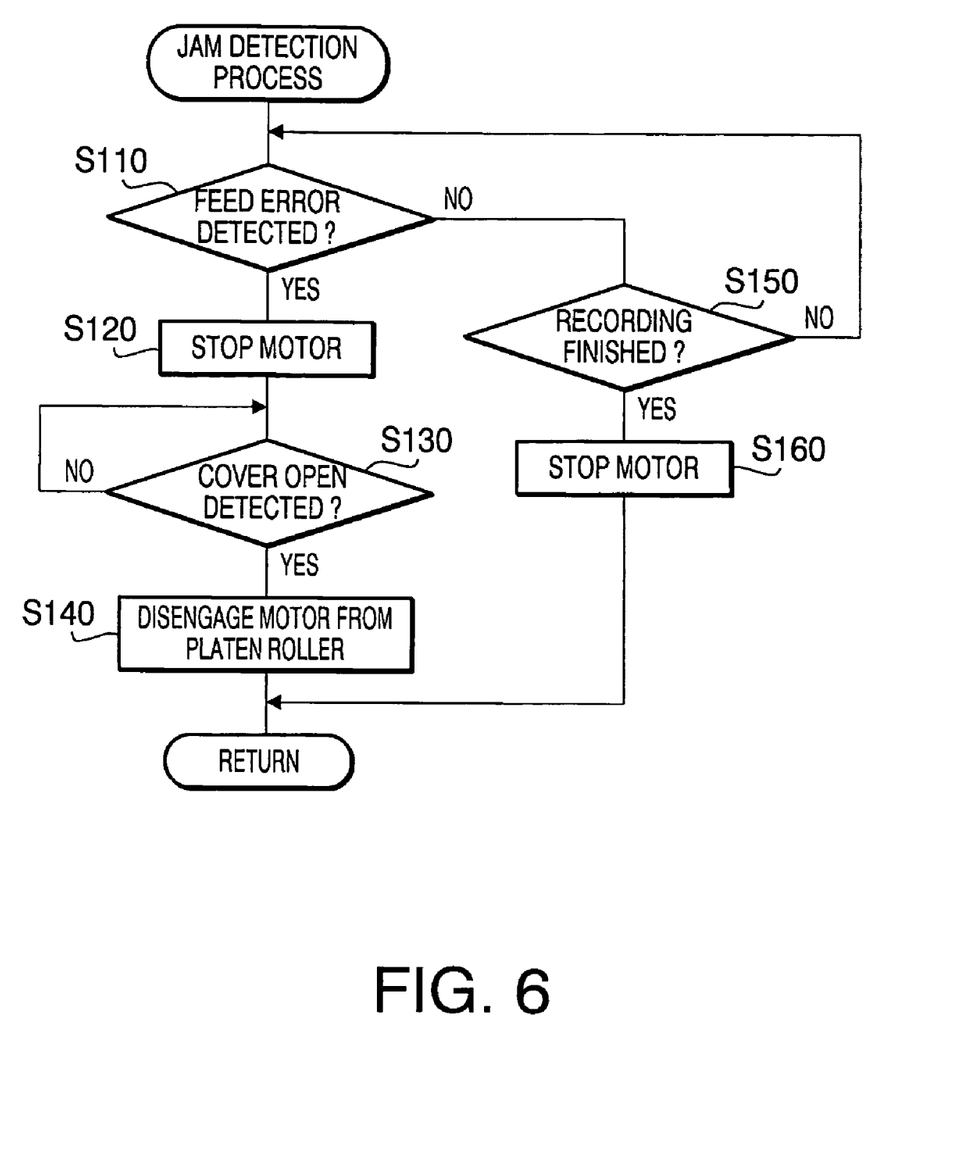
FIG. 6 is a flowchart illustrating a jam detection procedure according to aspects of the invention.

FIG. 6 shows a flowchart illustrating a jam detecting process which is executed by the CPU 81 during image formation on the recording sheet 7. When an image is received from the external public telephone line and recording of the image on the recording sheet 7 and the rotation of the motor 51 (i.e., clockwise rotation) are started, the jam detecting process is started. It should be noted that, at an initial stage of the image formation, the motor 51 rotate clockwise, and the planetary gear 55 engages with the first driven gear 61, thereby the rotational force of the motor 51 can be transmitted to the recording unit platen 13.

When the jam detection process is started, the process judges whether an error related to the feeding of the recording sheet 7 has been detected in accordance with the status of the recording sheet presence/absence detection switch 30 (S110). If no error has been detected (S110: NO) and image formation is executed normally, the process judges whether the image formation has been completed (S150). If the image formation has not been finished (S150: NO), the process returns to S110. If the image formation has been completed (S150: YES), the process stops the motor 51 to rotate (S160), and finishes the jam detection process.

If an error related to the feeding of the recording sheet 7 has been detected (S110: YES), the process stops the motor 51 (S120), and keeps a standby state until the cover 3 is opened (S130). Whether the cover 3 is opened is detected based on the ON/OFF status of the cover open/close detection switch 41.

When the cover 3 is opened and the cover open/close detection switch 41 is turned OFF (S130: YES), the process release a connection between the motor 51 and the recording unit platen 13 so that the user can handle the jam condition easily (S140). Specifically, as described previously, the motor 51 is rotated counterclockwise and the planetary gear 44 is disengaged from the first driven gear 61. With this disengagement, the recording unit platen 13 can be rotated freely by the user.

(4) Jam Handling Process

Next, a jam handling process which is executed when the jam of the recording sheet 7 occurs during the image formation on the recording sheet 7 will be described with reference to FIGS. 7 and 8.

When the recording sheet presence/absence detection switch 30 detects that the recording sheet 7 is not set normally or is not fed (i.e., an error status), an indication of occurrence of an error is displayed on the display panel 38. Viewing this indication, the user recognizes that an error related to the recording sheet 7 has occurred.

Figure 7:
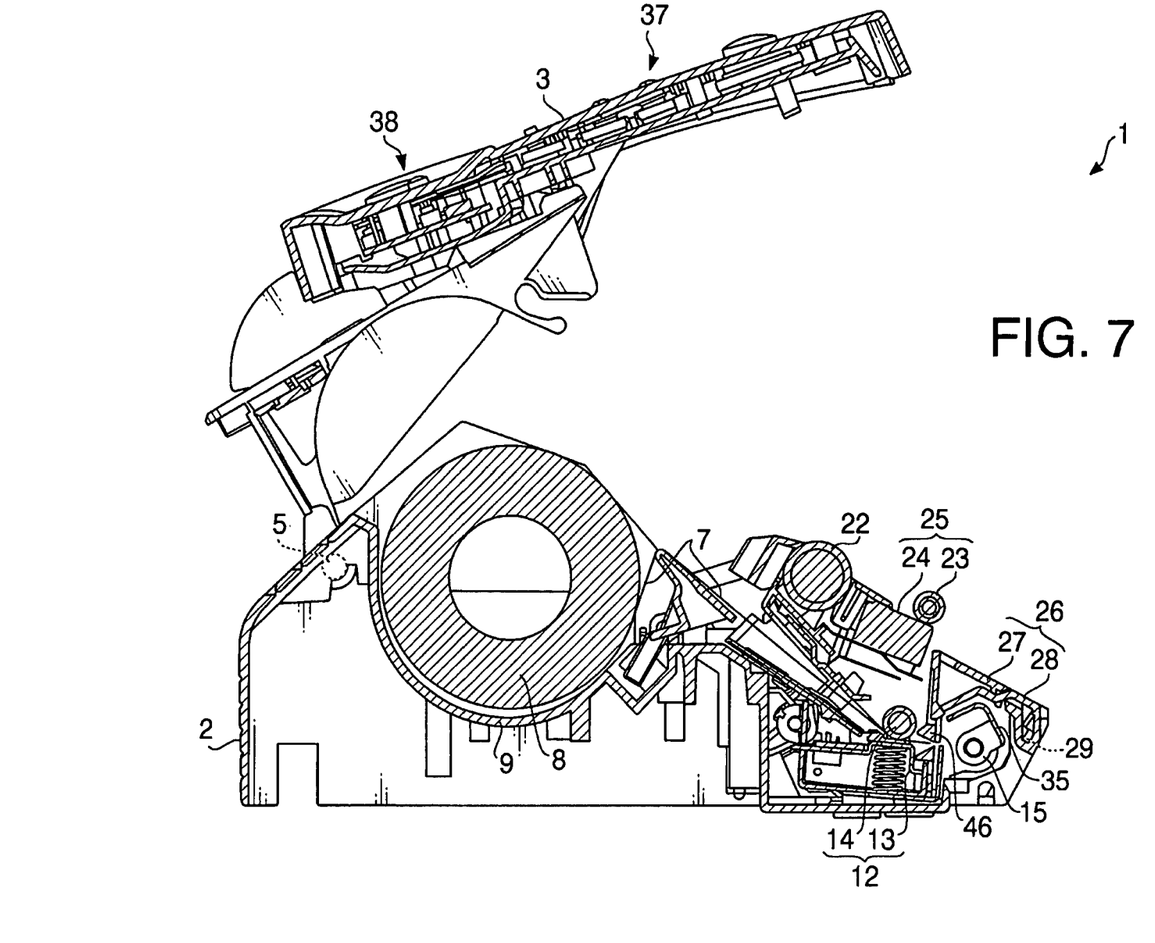
FIG. 7 is a cross-sectional side view of the facsimile apparatus with the main cover being opened.

After the error has occurred, when the user opens the cover 3 as shown in FIG. 7, the original reading unit 25, ADF roller 22 and openable cover 27 are exposed to outside. The image forming unit 12 is covered with the openable cover 27, it cannot been viewed from outside in a state shown in FIG. 7. Therefore, if the recording sheet 7 is jammed in the image forming unit 12, it is difficult to remove the jam status.

Since the cover 3 is opened, the connection between the motor 51 and the recording unit platen 13 is released, and the recording unit platen 13 can be freely rotated by an external force. Therefore, for a jam in which the recording sheet 7 winds around the recording unit platen 13, simply by pulling the recording sheet 7, the user can remove the recording sheet 7.

In a worse case, however, the recording sheet 7 may be broken when pulled by the user in the vicinity of the image forming unit 12. In such a case, by opening the openable cover 27, the user can remove the remaining recording sheet 7.

Specifically, the openable cover 27 is configured such that it rotates about the rotational shaft 29 as shown in FIG. 8. By opening the openable cover 27, the image forming unit 12 is exposed to outside. Therefore, the user can make use of a jam handling space 48 and remove the resident recording sheet 7. If necessary, the user can apply force to rotate the recording unit platen 13 by hand or using some tool in order to remove the recording sheet 7.

As above, according to the facsimile apparatus 1 described above, when the jam of the recording sheet 7 occurs, the user can make the recording unit platen 13 freely rotatable simply by opening the cover 3. Further, by opening the openable cover 27, the image forming unit 12 is exposed to outside. Thus, the user can handle the jam (i.e., remove the jammed recording sheet 7).

On the front side of the image forming unit 12, the cutting unit 15 for cutting out the recording sheet 7 is provided. When the openable cover 27 is opened, the cutting unit 15 may be exposed to outside. In order to prevent the cutting unit 15 from being exposed to outside, the upper portion is covered with a cutting unit cover 35. Therefore, even if the openable cover 27 is opened, handling of the jammed recording sheet 7 can be performed safely.

According to the facsimile apparatus 1 described above, when the jam of the recording sheet has occurred in the image forming unit or in the vicinity thereof, by opening the openable cover 27, the user can directly access the image forming unit 12 or in the vicinity thereof by hand or with some tool. Thus, the recording sheet 7, which is jammed or may be broken (torn off) can be removed relatively easily.

Further, on the openable cover 27, a sheet guide 47 is formed, which guides the recording sheet 7 on which an image has been formed in the discharging direction. Thus, the sheet guide 7 can suppress occurrence of the jam. Further, the sheet guide 46 is integrally formed on the openable cover 27.

Thus, according to the configuration described above, the discharging guide for suppressing the jam can be provided inexpensively without upsizing the facsimile apparatus 1.

Further, when the jam of the recording sheet 7 is detected, and the user opens the cover 3, the engagement of the motor 51 and the recording unit platen 13 is released. Then, the recording unit platen 13 can be freely rotated, and the user can rotate the same by hand. With this configuration, even if the recording sheet 7 is wound around the recording unit platen 13, simply by pulling the recording sheet 7, it can be removed easily.

It is noted that, the disengagement of the motor 51 from the recording unit platen 13 is not done simply by opening the cover 3, but after the recording sheet presence/absence detection switch 30 detects that there is no recording sheet. Therefore, the engagement of the motor 51 and the recording unit platen 13 is removed only when necessary (i.e., when an error in feeding the recording sheet 7 occurs). Therefore, when no error has occurred, unnecessary operation (i.e., unnecessary disengagement) will not be performed.

According to the above-described configuration, the rotational force of the motor 51 is transmitted to the recording unit platen 13 via the motor gear 53, the sun gear 54, the planetary gear 55, and the recording unit driven gear train 56. Engagement/disengagement between the motor 51 and the recording unit platen 13 are achieved by engagement/disengagement between the planetary gear 55 and the first driven gear 61. Further, the engagement/disengagement can be done simply by switching the rotational direction of the motor 51. That is, only by controlling the rotational direction of the motor 51, the engagement of the motor 51 with the recording unit platen 13 can be controlled.

The present invention should not be limited to the configuration of the above-described illustrative embodiment, but may be embodied in various ways without departing from aspects of the invention.

For example, in the above-described configuration, the motor 51 is disengaged from the recording unit platen 13 when the recording sheet presence/absence detection switch 30 detects an error condition relating to the feeding of the recording sheet 7 (S110: YES) and further, when the user opens the cover 3 (S130: YES), the motor 51 is rotated counterclockwise to disengage the planetary gear 55 from the first driven gear 61, thereby releasing the engagement between the motor 51 and the recording unit platen 13.

Alternatively, an modified configuration in which the disengagement can be achieved simply by opening the cover 3. In such a case, S100, S150 and S160 of the flowchart shown in FIG. 6 can be omitted. Further alternatively, the disengagement between the motor 51 and the recording unit platen 13 may be released when the feeding error of the recording sheet 7 is detected, regardless of the open/close status of the cover 3. In such a case, S130 can be omitted from the flowchart shown in FIG. 6.

According to the illustrative embodiment, one of the conditions to be satisfied to release the engagement between the motor 51 and the recording unit platen 13 is to open the cover 3. Instead of this condition or in addition to this condition, to open the openable cover 27 may be included in the conditions to be satisfied.

In the illustrative embodiment, the rotational force of the motor 51 is transmitted to the recording unit platen 13 via the motor gear 53, the sun gear 54, the planetary gear 55, and the recording unit driven gear train 56. A concrete configuration for transmitting the rotational force from the motor 51 to the recording unit platen 13 needs not be limited to the configuration described above. The structure of the driven gear train, including the number of gears, can be designed arbitrarily. If the rotational force of the motor 51 is transmitted to the recording unit at appropriate rotational speed and torque, and the engagement of the motor 51 and the recording unit platen 13 can be released when necessary, the structure can be modified in various ways.

Further, in the description above, a facsimile apparatus 1 employing the thermal head 14 and recording sheet 7 made of thermo-sensitive sheet is described as an embodiment of the invention. It is appreciated that the facsimile apparatus 1 is only an example according to aspects of the invention. The invention can be applied to any image processing apparatus provided with an image reading (scanning) unit and image forming unit, and a discharge guiding member that covers the image forming unit. Such an apparatus may include a copier and an MFP (Multi-Function Peripheral).

What is claimed is:

1. An image processing apparatus, comprising:
an image reading unit configured to read an image on an original, the original being discharged from a discharging side of the image reading unit;
an image forming unit configured to form an image on a recording medium; and
a discharge guide configured to guide the original to the discharging side of the image reading unit, the discharge guide being arranged to cover the image forming unit from the discharging side of the image reading unit,
wherein the discharging guide is configured to be movable between an opened position and closed position with respect to the image forming unit, the image forming unit being uncovered when the discharging guide is located at the opened position.

2. The image processing apparatus according to claim 1, wherein the discharge guide includes a recording medium guiding part that guides the recording medium, on which the image forming unit has formed an image, in the discharging direction when the discharge guide is located at the closed position.

3. The image processing apparatus according to claim 1, wherein the image forming unit includes:
a recording head that records an image on the recording medium;
a platen roller that feeds the recording medium with pressing the recording medium toward the recording head; a driving unit that is connected to the platen roller and drives the platen roller to rotate; and
a releasing mechanism that releases engagement between the driving unit and the platen roller.

4. The image processing apparatus according to claim 3, further including an error detection unit that detects an error status in which the recording medium is not fed normally during image formation by the image forming unit,
wherein the releasing mechanism release the engagement between the driving unit and the platen roller when the error detection unit detects the error status.

5. The image processing apparatus according to claim 3, further including a switching device that allows releasing of the engagement between the driving unit and the platen roller,
wherein the releasing mechanism releases the engagement between the driving unit and the platen roller when the switching device allows the releasing of the engagement.

6. The image processing apparatus according to claim 5, wherein the switching device has an ON state and an OFF state, one of the ON state and OFF state represents allowance of the releasing of the engagement.

7. The image processing apparatus according to claim 6, further includes an error detection unit that detects an error status in which the recording medium is not fed normally during image formation by the image forming unit,
wherein the releasing mechanism releases the engagement between the driving unit and the platen roller when the switching device allows the releasing of the engagement and the error detection unit detects the error status.

8. The image processing apparatus according to claim 7, wherein the driving unit includes a motor having a rotational shaft,
wherein the image processing apparatus further comprises a driving force transmitting mechanism which is connected to the rotational shaft of the motor and transmits a rotational force to the platen roller, and
wherein the releasing mechanism releases the engagement between the driving unit and the platen roller by disengaging the motor from the driving force transmitting mechanism.

9. The image processing apparatus according to claim 8, wherein the driving force transmitting mechanism includes at least one transmitting gear, wherein the releasing mechanism includes:
a motor controller configured to control a rotational direction of the motor;
a sun gear rotated by the motor; and
a planetary gear that always engages with the sun gear, the planetary gear being engaged with the one transmitting gear included in the driving force transmitting mechanism,
wherein the releasing of the engagement between the motor and the platen roller is achieved by rotating the motor in a direction opposite to a direction where the planetary gear engages with the one transmitting gear and the rotational driving force is transmitted to the platen roller.

10. The image processing apparatus according to claim 7, further comprising a cutting unit configured to cut out the recording medium after an image is formed thereon,
wherein the discharging guide is configured to cover the cutting unit as well as the image forming unit,
wherein the image processing apparatus further comprises a protecting member that prevents the cutting unit from being uncovered when the discharging guide is located at the open position.

11. The image processing apparatus according to claim 7, wherein the image forming unit is arranged below the image reading unit such that at least a part of the image forming unit is hidden by the image reading unit when viewed from a top of the image processing apparatus.

12. The image processing apparatus according to claim 3, wherein the driving unit includes a motor having a rotational shaft,
wherein the image processing apparatus further comprises a driving force transmitting mechanism which is connected to the rotational shaft of the motor and transmits a rotational force to the platen roller, and
wherein the releasing mechanism releases the engagement between the driving unit and the platen roller by disengaging the motor from the driving force transmitting mechanism.

13. The image processing apparatus according to claim 12, wherein the driving force transmitting mechanism includes at least one transmitting gear,
wherein the releasing mechanism includes:
a motor controller configured to control a rotational direction of the motor;
a sun gear rotated by the motor; and
a planetary gear that always engages with the sun gear, the planetary gear being engaged with the one transmitting gear included in the driving force transmitting mechanism,
wherein the releasing of the engagement between the motor and the platen roller is achieved by rotating the motor in a direction opposite to a direction where the planetary gear engages with the one transmitting gear and the rotational driving force is transmitted to the platen roller.

14. The image processing apparatus according to claim 1, further comprising a cutting unit configured to cut out the recording medium after an image is formed thereon,
wherein the discharging guide is configured to cover the cutting unit as well as the image forming unit,
wherein the image processing apparatus further comprises a protecting member that prevents the cutting unit from being uncovered when the discharging guide is located at the open position.

15. The image processing apparatus according to claim 1, wherein the image forming unit is arranged below the image reading unit such that at least a part of the image forming unit is hidden by the image reading unit when viewed from a top of the image processing apparatus.

* * * * *